United States Patent [19]

Zielinski et al.

[11] Patent Number: 5,274,049

[45] Date of Patent: * Dec. 28, 1993

[54] FLUORINATION OF ARTICLES MOLDED FROM ELASTOMERS

[75] Inventors: Ronald E. Zielinski; Mark J. Seabury, both of Fort Wayne, Ind.

[73] Assignee: William S. Shamban, Pacific Palisades, Calif.

[*] Notice: The portion of the term of this patent subsequent to May 25, 2010 has been disclaimed.

[21] Appl. No.: 732,631

[22] Filed: Jul. 19, 1991

[51] Int. Cl.$^5$ ............................................. C08F 8/22
[52] U.S. Cl. ................... 525/356; 525/326.4; 525/329.3; 525/330.3; 525/331.2; 525/331.7; 525/332.8; 525/332.9; 525/333.1; 525/333.2; 525/334.1
[58] Field of Search ............... 525/356, 326.4, 329.3, 525/330.3, 331.2, 331.7, 332.8, 332.9, 333.1, 333.2, 334.1

[56] References Cited

U.S. PATENT DOCUMENTS

| | | | |
|---|---|---|---|
| 2,497,046 | 10/1945 | Kropa | 260/92.1 |
| 3,992,221 | 11/1976 | Homsy et al. | 134/16 |
| 4,020,223 | 4/1977 | Dixon | 428/224 |
| 4,076,916 | 2/1978 | Lagow | 526/43 |
| 4,144,374 | 3/1979 | Lagow et al. | 428/334 |
| 4,404,256 | 9/1983 | Anand et al. | 525/356 |
| 4,593,050 | 6/1986 | Cohen et al. | 525/356 |
| 4,621,107 | 11/1986 | Lagow et al. | 522/131 |
| 4,900,793 | 2/1990 | Lagow et al. | 525/326.3 |

OTHER PUBLICATIONS

"The Direct Fluorination of Hydrocarbon Polymers" by Otsuka and Lagow, Journal of Fluorine Chemistry (1974) 371-380.

"The Controlled Reaction of Hydrocarbon Polymers with Elemental Fluorine" by Lagow and Margrave, Polymer Letters Ed. vol. 12, pp. 177-184 (1974).

Primary Examiner—Bernard Lipman
Attorney, Agent, or Firm—Baker & Daniels

[57] ABSTRACT

A method of reducing the static and dynamic coefficients of friction and improving the wear life of thermoset elastomeric articles is disclosed. The elastomeric articles are fluorinated in the presence of a hydrogen fluoride scavenger under conditions sufficient to reduce said friction coefficient and improve said wear life, without promoting degradation of the tensile properties of the articles.

23 Claims, 7 Drawing Sheets

FLUORINATION OF ARTICLES MOLDED FROM ELASTOMERS

BACKGROUND OF THE INVENTION

This invention relates generally to a method for modifying by fluorination articles molded from thermoset elastomers, in order to reduce the static and dynamic friction characteristics and to increase the wear life and abrasion resistance of the elastomers. The invention also relates to elastomeric articles modified by the fluorination method.

An elastomer is generally a polymeric material that possesses an inherent property known as elasticity which allows it to return to its original form when released from a deforming load. An elastomer is capable of a substantial degree of stretching under tension before breaking.

Elastomers are commonly used in a wide range of applications. These applications include, but are not limited to: static and dynamic seals, couplings, rollers, bushings, diaphragms, gears and shock absorbers. The performance of elastomers used in these and other applications is often limited because of the inherent high friction and high wear characteristics of these materials. Several methods of improving these undesirable properties are currently in use in industry. The most common of these methods is to add to the elastomer formulation a material that is typically referred to as a "process aid", or "internal lubricant". Many such materials are commercially available, including waxes, silicones, fatty acids, fluorocarbons, polyethylenes, etc. When the elastomer formulation is processed into a finished part via molding, the process aid diffuses to the surface of the article. During operation, a lubricative layer is formed between the elastomer and mating surface, which lowers friction and, to some extent, increases wear life. This effect, however, is often short-lived since the internal lubricant gradually wears away. This technique introduces foreign material to the elastomer matrix and also has a tendency to induce non-uniform performance since the lubricant's diffusion rate is controlled by temperature and pressure, both of which can vary considerably over the operational conditions.

Another common technique which is used to improve the friction characteristics of certain elastomers is to etch the surface of the finished article with a dilute aqueous chlorine solution, derived from muriatic acid and sodium hypochlorite. However, the use of this procedure is generally limited to NBR-based elastomers. In addition, the etched layer is very thin and quickly wears away during normal operation so that the friction problem returns.

Other techniques are also used to reduce friction in elastomeric materials. These include coating finished articles with PTFE, silicone grease or other external lubricants. Occasionally, a low friction coating may be used in tandem with an internal lubricant.

The common factor between all the techniques discussed above is that the benefits that arise from each technique are short-term only. The root of the problem, i.e. the inherent high friction in the elastomeric materials, is not addressed.

It is highly desirable, therefore, to generate low friction elastomeric materials which retain low friction and high wear resistance characteristics for substantial periods of time.

SUMMARY OF THE INVENTION

The present invention discloses a procedure by which the chemical structure of the polymer itself is modified s that low friction material is generated on the outside of the finished article. Since the low friction material is part of the elastomer matrix, it is not prone to the problems of diffusion or rapid wear typically associated with an internal or external lubricant. As a result, and due to the exceedingly low friction coefficients generated in certain materials, it has been possible to considerably extend wear life in these materials, especially when used in dynamic applications.

This invention, therefore, comprises a method of reducing the static and dynamic friction coefficients, and increasing the wear life and abrasion resistance, of articles molded from thermoset elastomers, and the articles produced by the method. Briefly stated, the method comprises contacting fabricated elastomeric articles with gaseous fluorine under carefully controlled conditions and in the presence of a hydrogen fluoride (HF) scavenger. This process modifies the chemical structure of the elastomer so that a fluorinated material is generated on the external portion of the elastomer and extends inward into the elastomer matrix.

The low friction characteristics of certain commercially available perfluorinated thermoplastics such as PTFE are well known. Similarly, the fluorinated materials generated by the methods of this invention endow the modified articles with low wear and low friction characteristics. Since the fluorinated material is part of the elastomeric matrix, it will not diffuse, leach or otherwise be lost from the material except through normal abrasive wear.

DETAILED DESCRIPTION OF THE PREFERRED EMBODIMENTS

Figure 1:
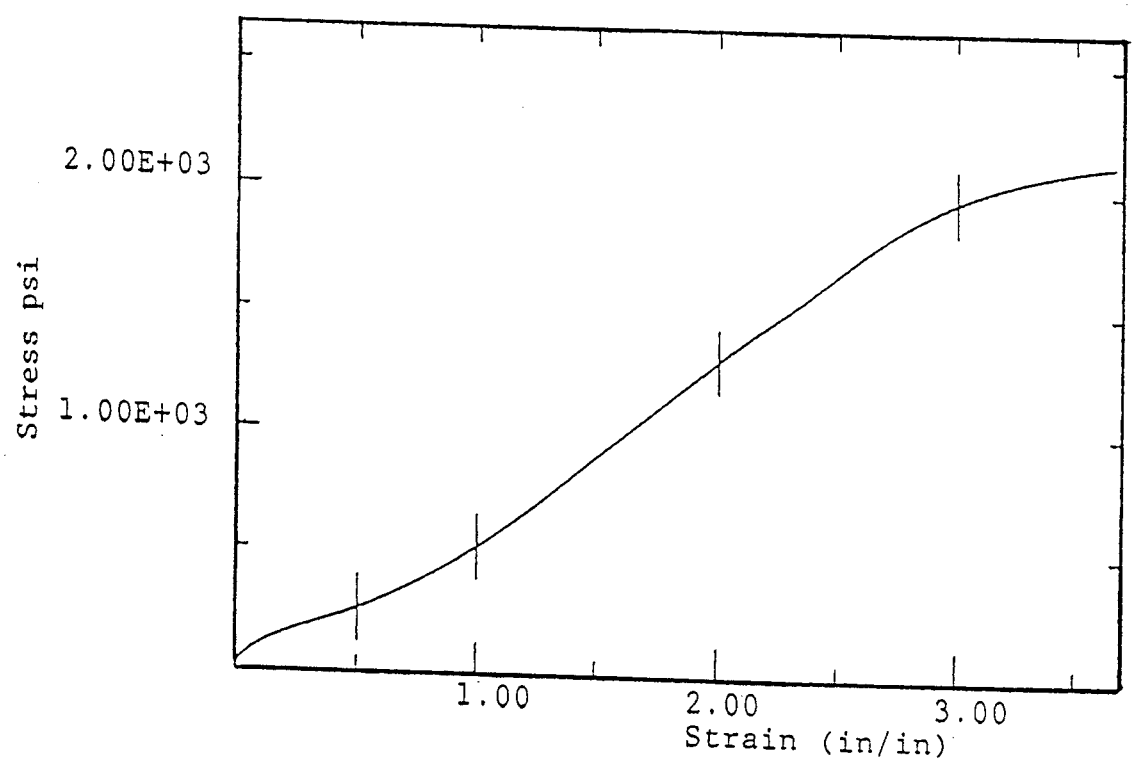
Figure 2:
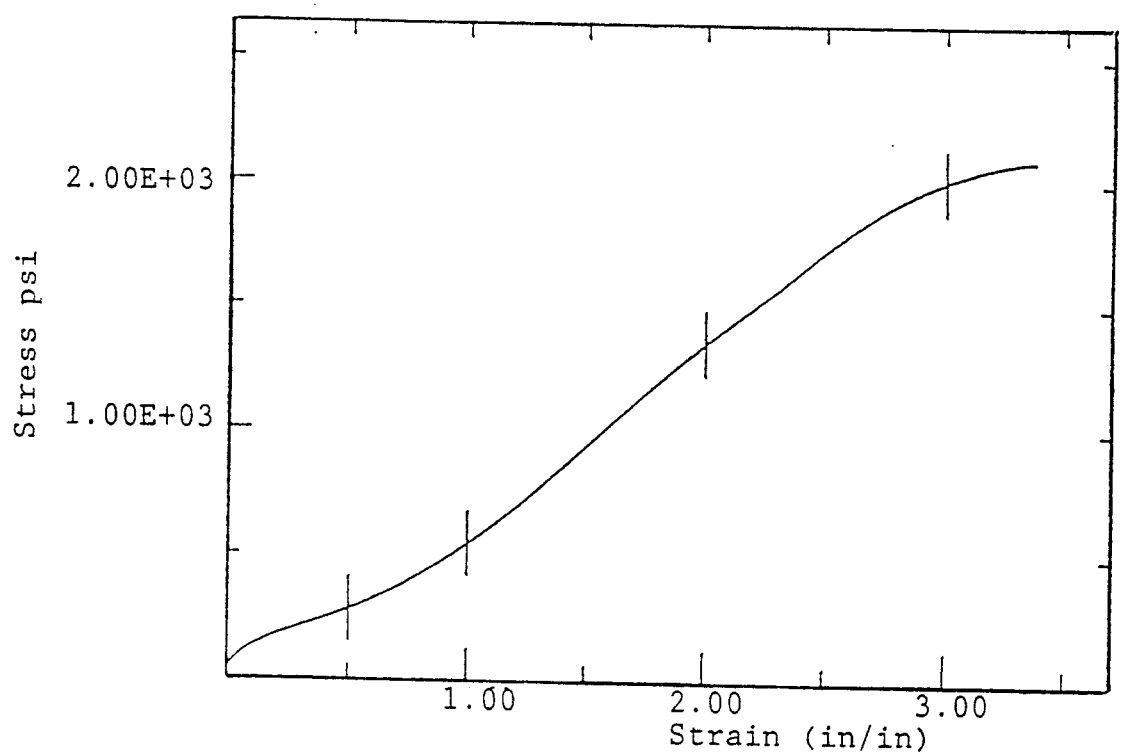
Figure 3:
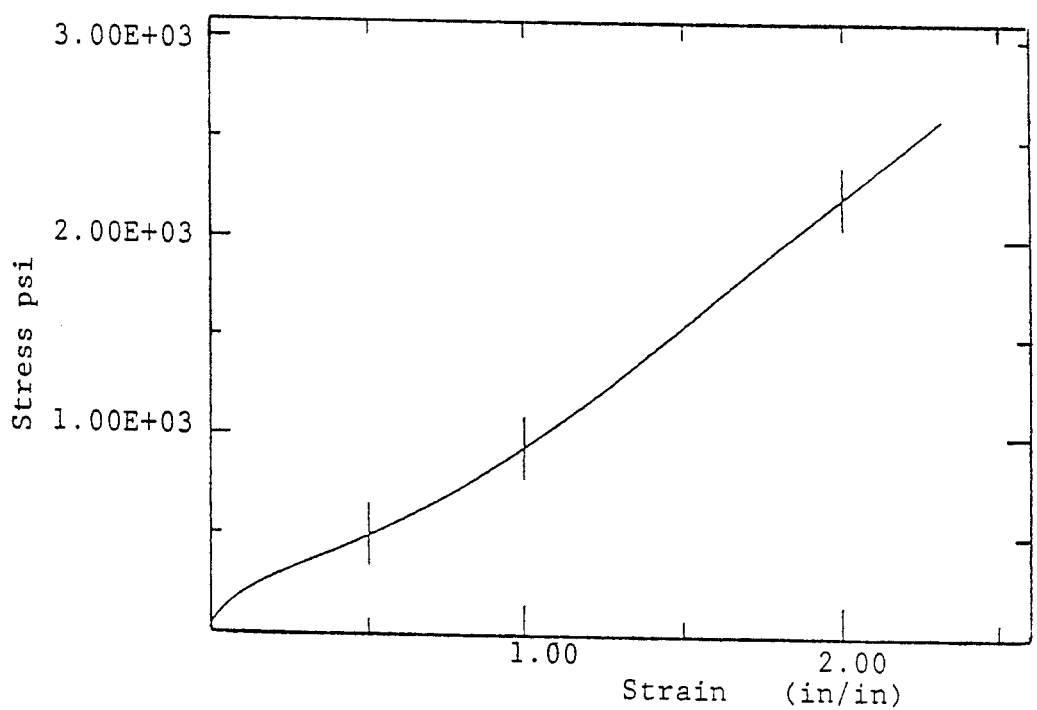
Figure 4:
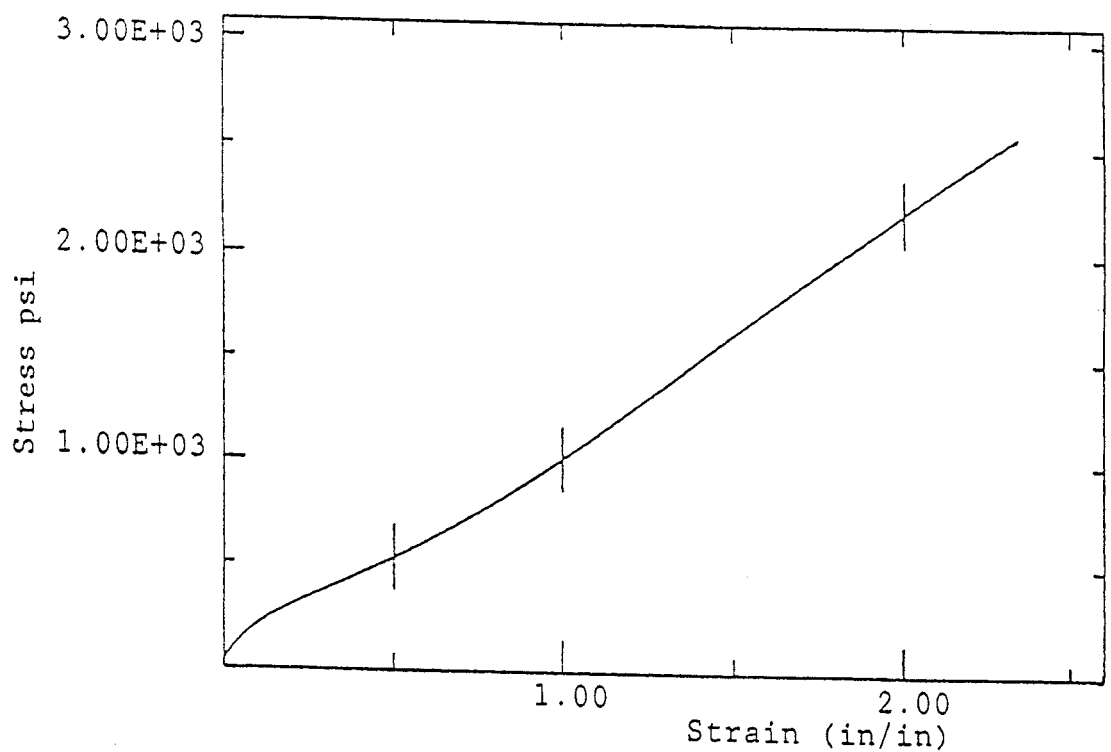

For an article to be amenable to fluorine modification according to the present invention it must be composed, either wholly or partially, of a suitable elastomeric polymer. Such a polymer should preferably possess a backbone chain which is primarily hydrocarbon in nature, i.e. essentially composed of carbon atoms to which are attached a high proportion of hydrogen atoms. The term "backbone" is understood and routinely used by those skilled in polymer chemistry.

When an article is contacted with fluorine gas, a chemical reaction takes place in which hydrogen atoms attached to the polymer chain are substituted by fluorine atoms, i.e. the polymer becomes "fluorinated". Hydrogen fluoride (HF) is generated as a by-product of this reaction, which may be represented (in non-stoichiometric form) by the following example:

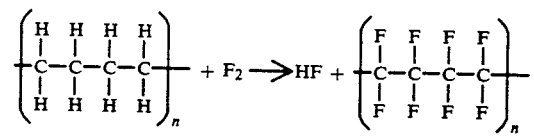

When all replaceable hydrogen atoms are substituted with fluorine atoms, "perfluorination" of the material is said to have occurred. Perfluorination of the article's surface in this manner produces optimum levels of friction reduction in the article.

This "fluorination reaction", which is very rapid and exothermic, takes place only where the elastomer comes in physical contact with gaseous fluorine, i.e. the reaction is essentially diffusion-controlled. Articles exposed to fluorine are consequently fluorinated from the outside inwards so that, initially, fluorination occurs only at those surfaces immediately exposed. Subsequent reaction takes place below the surface. The depth of penetration by fluorine into the article, and hence the depth of the fluorinated layer, will vary with the material and is governed by temperature, pressure, fluorine concentration and duration of reaction.

Elastomers suitable for fluorine modification according to the present invention need not necessarily be completely hydrocarbon in nature. The polymer backbone should, however, contain enough hydrocarbon character (i.e. sufficient replaceable aliphatic carbon-hydrogen bonds) that the fluorinated matrix generated upon contacting the system with fluorine will possess the desired level of friction reduction Backbone chains which contain other groups or atoms in addition to carbon, or possess pendant groups attached to the backbone, may also be suitable for fluorine modification. However, these atoms or groups should not interfere with the process or react unfavorably with fluorine so as to promote degradation or fragmentation of the polymer backbone. The suitability of a given elastomer to direct fluorination via the processes disclosed in this invention, and the reduction in friction coefficients attainable, may be established through routine experiment by those skilled in the art.

The preferred method of this invention is direct fluorination using fluorine gas. The procedure may be performed in a number of ways. The preferred method requires placing a fabricated article into a suitable reactor vessel and exposing said article to fluorine gas. This process liberates HF as the article is fluorinated. HF is an undesirable by-product since it may interfere with the fluorination process and/or degrade the bulk material. It is usually removed from the process by adding a suitable "scavenger", such as sodium fluoride (NaF), to the reactor vessel. This reacts with HF to produce sodium bifluoride ($NaF + HF \rightarrow NaHF_2$) which is relatively benign to the process.

The reactor vessel should be purged with an inert gas, such as nitrogen or helium, prior to commencing the fluorination reaction. This will minimize the generation of acid fluoride groups (and their carboxylic acid hydrolysis products) in the modified article by excluding oxygen from the reaction medium. For the same reasons, traces of moisture must also be removed from the reaction medium. The presence of carboxylic acid groups can adversely affect the friction and wettability characteristics of the fluorinated article.

Fluorine gas used in this procedure is preferably diluted with nitrogen or helium before it enters the reactor vessel. The fluorine content of this "process gas" will range from small amounts such as about 0.5% up to 100%, depending on the elastomer considered and its ultimate application. Since the process is very exothermic, the fluorine content of the mixture must be carefully controlled. Excessive exposure to fluorine, particularly at the start of the reaction, can cause the combustion of the article being fluorinated For most applications, a process gas mixture containing from about 2 to about 95% fluorine by volume is preferred, with a process gas containing from about 5 to about 75% fluorine by volume being most preferred.

The reaction of fluorine with any given elastomer will usually result in a certain degree of chain scission in addition to the desired fluorination reaction. Scission is the rupture of backbone or crosslinking bonds in the elastomer matrix. This process can be detrimental to the desired reaction as it usually involves fragmentation of the polymer backbone. Excessive backbone fragmentation ultimately results in degradation of the tensile properties of the elastomer which may adversely effect the performance of the fluorinated article For a given elastomer, scission will tend to increase with exposure time at a given fluorine concentration, or with increasing fluorine concentration. Consequently, when an elastomer is modified by methods of this invention, the fluorination conditions must be optimized so that a maximum reduction in friction coefficient may be obtained with a minimum of polymer degradation. This is particularly important when modifying an elastomeric component which is to conform to the physical requirements of a particular specification The precise fluorination conditions used to modify a given article will depend upon the type of elastomer from which the article is fabricated. For any given elastomer these conditions will vary according to the desired application of the modified elastomer, and may be established through routine experimentation using the methods disclosed in this invention.

The method of the present invention does not provide for the perfluorination of the entire body of the article. This process would effectively create a new material having potentially very different physical properties from the original. The purpose of the present invention is to create articles having low coefficients of friction through modification of their surface and immediate subsurface, while essentially maintaining the remaining original physical properties of the article. Since the original tensile properties of the article are not appreciably altered, the invention permits the direct replacement of articles (including those requiring qualification of the elastomer to a particular specification) used in existing applications, with polymer modified articles of the same material and configuration, yet having improved wear life and reduced static and dynamic coefficients of friction.

The preparation of articles by the method of the present invention negates the need to create thermoset elastomeric articles specially formulated to reduce high friction. Elastomers are often formulated—that is, compounded with various types of fillers, plasticizers and other processing compounds—so that a range of potential physical properties may be accommodated by that elastomer as required. The process for friction reduction of elastomeric articles described by the present invention is generally polymer-dependent and not formulation-dependent. That is, a given elastomer could be formulated in a number of different ways, but as long as that elastomer is compatible with the process, its various possible formulations should be amenable to the fluorination procedure. For example, it has been established that NBR-based elastomers can have their friction coefficients dramatically reduced by the methods of this invention. This is true, regardless of the formulation, the ACN content of the elastomer, or its manufacturer.

A variety of fluorine reactor vessel designs are suitable for carrying out the invention and are known to those skilled in the art. Preferred examples include magnetically- or mechanically-stirred bomb type vessels and rotating drum reactors. Suitable materials for reactor vessel construction include monel, inconel, hastelloy, brass, stainless steel or any other metal not subject to corrosion by fluorine under the operating conditions used.

The fluorination reaction must be performed under carefully controlled conditions so that fluorination of the article is achieved without significant loss of its tensile properties. Specifically, the temperature, pressure, fluorine concentration and duration of reaction must all be carefully monitored. Preferably, flow rates of fluorine and nitrogen gases used in the process are controlled and measured by mass flow controllers. Use of these devices allows one to accurately manipulate the fluorine concentration in the process gas mixture and control its rate of delivery to the reactor vessel. Technical grade (97% or better) fluorine and Ultra Pure Carrier grade (or better) nitrogen are the preferred reagents for this process. However, other grades of fluorine or nitrogen may also be used. For example, fluorine pre-diluted with nitrogen may be used in place of technical grade fluorine. Obviously, the use of fluorine gas mixtures in this way limits the maximum fluorine concentration in the reactor, which may not be desirable in circumstances where high fluorine levels are required.

Preferably, the article/articles to be fluorinated are placed in the reactor vessel together with a hydrogen fluoride scavenger. Finely divided sodium fluoride is the preferred scavenger, although other scavengers (for example, potassium fluoride) may also be used with favorable results. The quantity of sodium fluoride used should be sufficient to react with all the HF formed in the reaction. As an approximate guideline, one gram of sodium fluoride may be added for every gram weight of material to be fluorinated. However, the stoichiometric quantity of sodium fluoride required will likely be significantly less than this. It is preferred that the articles are in close physical contact with the scavenger during the fluorination process; this optimizes the scavenging process. This may be done, for example, by stirring the articles in a bed of powdered sodium fluoride. For larger articles it may be necessary to tumble the articles with the scavenger in a rotating drum-type vessel. Acceptable results may also be obtained without agitation of the articles and in certain circumstances (for example, where a slight deterioration of original tensile properties is acceptable) the reaction may be performed without the presence of an HF scavenger in the reactor.

Once the reactor vessel is loaded, it is continuously purged with UPC grade nitrogen (or other inert gas) for sufficient time that oxygen and water vapor are flushed from the chamber. Fluorine is then added to the nitrogen flow so that a mixture of fluorine in nitrogen passes directly into the reactor vessel, where it contacts with the articles to be fluorinated.

Typical fluorination reaction parameters (i.e fluorine and nitrogen flow rates, duration of reaction, etc.) will vary somewhat between samples. Specific reaction parameters will depend on a number of factors, including desired reduction in friction coefficient, type of material, size of reactor vessel, and surface area and weight of articles to be fluorinated. Articles of virtually any size and configuration may be fluorinated by the methods disclosed in this invention, limited only by the capacity of the reactor vessel. Additionally, the only limit to the number of articles which may be fluorinated in one batch is the capacity of the reactor vessel.

Articles produced by the method of the present invention are particularly useful in applications where the performance of an article has been limited by its high friction and wear characteristics. For example, articles produced by the method of the present invention are particulary useful for improving the performance of static and dynamic elastomeric seals. Those skilled in the art will additionally recognize that there are numerous other potential applications of this invention. If these other beneficial applications follow the teachings of the present invention, such applications are within the scope of this invention.

Articles suitable for modification by the methods of this invention should therefore comprise a thermoset elastomeric formulation that is compatible with the fluorination process. Thermoset elastomers are typically formulated with fillers, plasticizers, curing agents and other additives well known to those skilled in the art of rubber chemistry, so that the resulting compound has physical characteristics required for service in a specific application. Generally speaking, base polymers and fillers typically account for 75–90% by weight of most elastomeric formulations.

The preferred fillers are carbon blacks, graphites and powders, which are quite benign to the fluorination process. Many other fillers commonly used in the art of rubber chemistry, such as silicone, calcium carbonate, glass powder, talcs and clays, may also be utilized in certain applications. However, since these latter fillers are susceptible in varying degrees to attack by fluorine, they are not generally as widely used as the preferred fillers listed above.

A large number of base polymers suitable for use in many applications are commercially available and may be formulated into an almost unlimited number of compounds. Generally speaking, base polymers suitable for use according to the present invention should possess a backbone chain which is sufficiently hydrocarbon in nature that the fluorinated matrix generated upon contacting the system with fluorine possesses the desired level of friction reduction.

Examples of commercially available base polymers which have been found to exhibit improved friction characteristics when compounded into an elastomer and fluorinated are listed below. This list is presented to illustrate specific examples of elastomers that are amenable to the present invention, and is not intended to be a complete listing of suitable elastomers. The polymers are referred to by their chemical names. Trade names of these polymers are well known to those skilled in the art and may be found, for example, in Rubber World Magazine's Blue Book (published annually by Lippincott and Peto Inc.). In many cases, more than one supplier of the same elastomer exists. The following elastomers are representative of those amenable to the present invention: polybutadienes, isobutylene-isoprene elastomers, chlorinated polyethylenes, chlorosulfonated polyethylenes, polyepichlorohydrins, ethylene/acrylic elastomers, ethylene-propylene copolymers, ethylene-propylene-diene terpolymers, tetrafluoroethylene-propylene copolymers, vinylidene fluoride-hexafluoropropylene copolymers, butadiene-acrylonitrile copolymers, polychloroprenes, styrene-butadiene copolymers, polyisoprenes, carboxy-modified butadiene-acrylonitrile elastomers and acrylonitrile-ethylene-butadiene terpolymers.

Examples of commercially available base polymers which have been found to exhibit impaired friction characteristics after exposure to fluorine include polyurethanes, fluorosilicones, and polyphosphazenes. The phrase "impaired friction characteristics" means that the static and dynamic coefficients of friction of these materials increased after exposure to fluorine.

Reaction Parameters

All reaction parameters presented in the Examples and the Tables provided below were established through experimentation using a magnetically-stirred brass reactor vessel having an internal volume of 0.75 liters. These parameters may be adjusted through routine experimentation to allow the use of alternative reactor designs and increased capacities.

Table 1 presents the ranges of parameters that were typically used to generate fluorinated articles having improved friction and wear properties. These parameters were used for articles composed of a variety of elastomers and elastomer formulations. Batch sizes ranged between 1-500 pieces and weighed between 0-100 grams. For a given article, the same reaction parameters would typically be used regardless of the batch size. The parameters were established through experimentation using the following criteria:
1) Significant reduction of articles' static and dynamic friction coefficients.
2) Minimal depreciation in articles' original physical properties.
3) Minimal duration of reaction.

TABLE 1

Typical Fluorination Reaction Parameters[1]

| FUNCTION | FLUORINE FLOW RATE (SCCM) | NITROGEN FLOW RATE (SCCM) | TIME (MINS) | FLUORINE PRESSURE (PSIA) |
|---|---|---|---|---|
| Purge Reactor | 0 | 100-200 | 30-60 | 0 |
| Fluorinate Articles | 5-40 | 15-50 | 60-240 | 15-30 |
| Purge Reactor | 0 | 100-200 | 30-60 | 0 |

[1] All reactions performed at ambient temperature.

Those skilled in the art will recognize that the process is sufficiently flexible that, for any given elastomeric article, the parameters may be adjusted to accommodate any desired level of fluorination and friction reduction. Although such elastomers may have characteristics that are inferior to the optimal properties that are achievable by this invention, they may be useful for specific applications.

The processes described in this invention were typically performed at room temperature. If desired, the fluorination can be done at temperatures ranging from about −100° C. to about 200° C.

Fluorinated articles generated according to the methods of this invention were analyzed by several techniques. Test results are presented in Tables 2 through 6, respectively. These techniques are summarized as follows:

Analytical Techniques:

1) Friction Coefficient Testing

Static and dynamic coefficients of friction were measured according to ASTM D 1894 using a Testing Machines, Inc. Monitor/Slip and Friction test fixture, which conforms to the ASTM specification. This test fixture determines friction coefficients by pulling a metal sled (to which the sample is mounted) of fixed weight (200 grams) across a polished glass plane. In all cases, samples were pulled a distance of no less than 3″ at a constant speed of 5″/min.

2) Taber Abrasion

Taber Abrasion data was determined on a Teledyne Taber Model 5150 Abraser, which conforms to ASTM D 3389.

A modification of this specification, developed by Akron Rubber Development Laboratory, Inc. (Akron, Ohio) was used to determine the number of abrasion cycles required to wear through the outer "skin" (formed on all elastomers as a consequence of the molding process) of fluorinated and non-fluorinated samples. The greater the number of abrasion cycles required, the greater the abrasion resistance of the material. For a given elastomer, "wear factor" has been defined as follows:

$$\text{Wear Factor} = \frac{\text{cycles to wear-through for non-fluorinated elastomer}}{\text{cycles to wear-through for fluorinated elastomer}}$$

A wear factor of less than one indicates that fluorination of the sample has increased its abrasion resistance.

In all cases, test samples were discs of material, 4½″ in diameter, cut from a standard 6″×6″ tensile sheet. H-18 wheels were used at a loading of 1 kg.

3) Tensile Testing

The mechanical behavior of an elastomer, that is, its deformation and flow characteristics under stress, can be characterized by its stress/strain properties. Important quantities which define the mechanical behavior of an elastomer are as follows:
a) 100% Modulus
b) Tensile Strength
c) 100% Elongation These properties are collectively referred to as the "tensile properties" of an elastomer.

The modulus, tensile strength and elongation of all samples were determined according to ASTM D 412 using an Instron Model 4204 Tensile Tester. Additionally, stress/strain curves were plotted to determine any significant differences in the mechanical behavior of fluorinated and non-fluorinated materials. Samples were cut (along the grain) from standard 6″×6″ tensile sheets using an ASTM die "C" dogbone die.

4) infrared Analysis

Infrared analysis of samples was performed according to ASTM D 2702 using a Nicolet Model 5 PC Fourier Transform Infrared (FTIR) Spectrometer.

Since the different functional groups present in any particular material absorb infrared radiation at certain characteristic frequencies, a plot of radiation intensity versus frequency (i.e. the infrared spectrum) will identify the chemical groups present in that material. Of particular interest are the absorption frequencies of carbon-hydrogen and carbon-fluorine bonds. Carbon-hydrogen bonds strongly absorb IR radiation at relatively short wavelengths, typically around 3,000 cm$^{-1}$, whereas carbon-fluorine bonds have a characteristic absorption at a much longer wavelength, typically around 1100 cm$^{-1}$.

FTIR spectra were obtained by using the Attentuated Total Reflectance (ATR) technique. (See, for example Mirabella, F. M. and Harrick, N. J. "Internal Reflection Spectroscopy: Review and Supplement" (1985)). This is a surface-analytical technique ideally suited to the IR analysis of opaque materials The fluorination of a sample is indicated by the appearance of characteristic absorptions in the 1100 cm$^{-1}$ region of its ATR spectrum. If these absorptions appear with a concommitant loss of peaks characteristic of carbon-hydrogen bonds, the replacement of hydrogen by fluorine is indicated.

5) Miscellaneous Wear and Prototype Testing

A variety of wear and prototype testing has been performed in order to measure the increase in life expectancy of articles fluorinated by the method described in the present invention. The general aim of this testing was to demonstrate the performance advantages of these articles in dynamic applications. This testing is discussed in further detail in the Examples.

Experimental Procedures:

1. Sample Preparation

In order to properly evaluate the scope of this invention it was necessary to first prepare suitable articles formulated from a number of different, commercially-available, base polymers.

All physical testing that was performed with the objective of establishing original physical properties was performed in accordance with the appropriate ASTM specification. All articles required for these tests were therefore prepared as required by each specification.

Test articles for friction coefficient, Taber Abrasion and tensile analysis were prepared by cutting the required configuration from a standard 6"×6" tensile sheet of material by using a metal die. For these test methods, sample configurations used were as follows:

| | |
|---|---|
| Friction Coeffiecient (ASTM D 1894) - | 2¼" × 2¼" × approximately .085". |
| Taber Abrasion (ASTM D 3389) - | Disc, 4¼" diameter × approximately .085" thick. |
| Tensile Testing (ASTM D 412) - | Die "C" dogbone, approximately .085"]thick. |

The "thickness" dimension of each article depended on the thickness of the tensile sheet from which it was prepared. Tensile sheets were prepared by compression molding of the uncured material, at the appropriate time and temperature, at a pressure of approximately 900 psi. Resulting sheets typically were of 0.85±0.020" thickness, depending on the material and cure conditions used.

Articles used in miscellaneous wear and cycle tests were typically finished articles of assorted configurations that were obtained from commercial suppliers. Once fluorinated, these articles were used in assorted cycle tests to determine the performance advantages over non-fluorinated articles. The articles were typically composed of material of unknown or proprietary formulation. However, the general class of base polymer in each formulation (i.e. EP, NBR, etc.) was generally known or could be established through standard procedures known to those skilled in the art of rubber chemistry.

2. Elastomers Used as Starting Materials

Commercially available base polymers were used in all cases. Each base polymer was blended or "compounded" with carbon black, plasticizer, curing agents and other additives using standard mixing procedures known to those skilled in the art of rubber chemistry. The polymers were compounded according to a specific formulation, so that the resulting elastomers would have physical characteristics required for service in specific applications. Since the base polymer and carbon black usually account for up to 90% by weight of the total formulation, the remaining additives generally have little influence on the effectiveness of the fluorination process. In other words, the process effectively depends on the class or type of base polymer an article contains and not the specific formulation. In many cases, the complete formulations of articles obtained from commercial suppliers were not available to the inventors. However, knowledge of the type of base polymer contained in these articles allowed the appropriate fluorination conditions to be developed in each case.

For the purposes of the present invention, the thermoset elastomeric articles are referred to by the base polymer or polymers from which they are fabricated. The chemical name of each polymer is used since several acceptable commercial sources of each polymer may be available. Physical testing has been performed on articles formulated from 12 different base polymers. This testing was carried out both prior to and after exposing said articles to fluorine. The particular fluorination conditions used in each case are presented in Table 3.

Testing was performed on the following elastomers:
1. An elastomeric formulation containing 40.0% by weight of ethylene-propylene copolymer (40% ethylene content) having a hardness of 80±5 Shore A when cured, labelled "EP".
2. An elastomeric formulation containing 40.0% by weight of a blend of acrylonitrile-butadiene copolymers (mean acrylonitrile content 29%), having a hardness of 70±5 Shore A when cured, labelled "NBR".
3. An elastomeric formulation containing 50.0% by weight of acrylonitrile-butadiene copolymer (acrylonitrile content 21%) and less than 1% by weight of an internal lubricant, having a hardness of 75±5 Shore A when cured, labelled "NBR-IL".
4. An elastomeric formulation containing 50.0% by weight of a blend of carboxy-modified acrylonitrile-butadiene copolymers (mean acrylonitrile content 22%) having a hardness of 80 ±5 Shore A when cured, labelled "XNBR".
5. An elastomeric formulation containing 65.0% by weight of a hydrogenated acrylonitrile-butadiene copolymer (98% hydrogenated; mean acrylonitrile content 38%) having 65±5 Shore A hardness when cured, labelled "HSNBR".
6. An elastomeric formulation containing 70.0% by weight of a vinylidene fluoride-hexafluoropropylene copolymer having 75±5 Shore A hardness when cured, labelled "FKM-1".
7. An elastomeric formulation containing 70.0% by weight of a vinylidene fluoride-hexafluoropropylene copolymer having 80±5 Shore A hardness when cured, labelled "FKM-2".
8. An elastomeric formulation containing 76.3% by weight of a tetrafluoroethylene-propylene copolymer having 70±5 Shore A hardness when cured, labelled "TFEP".

9. An elastomeric formulation containing 51.2% by weight of an isopropylene-isobutylene copolymer having 70±5 Shore A hardness when cured, labelled "IIR".
10. An elastomeric formulation containing 48.8% by weight of an ethylene-methyl acrylate copolymer having 70±5 Shore A hardness when cured, labelled "ACM".
11. An elastomeric formulation containing 38.5% by weight of poly(chlorobutadiene) having a hardness of 80±5 Shore A when cured, labelled "CR".
12. An elastomeric formulation containing 48.3% by weight of chlorosulfonated polyethylene base polymer having a cured hardness of 70±5 Shore A, labelled "CSM".

Original physical properties of the starting materials are listed in Table 2. All this data has been determined according to standard ASTM procedures as discussed above.

TABLE 2

Physical Characteristics of Starting Materials

| Elastomer | Tensile Strength (psi) | Elongation (%) | 100% Modulus (psi) | Hardness[1] (Shore A) | Friction Coefficient Static | Friction Coefficient Dynamic |
|---|---|---|---|---|---|---|
| EP | 1700 | 170 | 810 | 80 | 1.36 ± .12 | 1.24 ± .11 |
| NBR | 2160 | 375 | 540 | 70 | 1.74 ± .24 | 1.31 ± .11 |
| NBR-IL | 1650 | 135 | 950 | 75 | 0.83 ± .09 | 0.71 ± .08 |
| XNBR | 2330 | 165 | 1140 | 80 | 0.97 ± .10 | 0.76 ± .14 |
| HSNBR | 3200 | 430 | 290 | 65 | 1.97 ± .15 | 1.50 ± .16 |
| FKM-1 | 2200 | 160 | 1400 | 75 | 1.49 ± .17 | 0.83 ± .04 |
| FKM-2 | 2700 | 235 | 1010 | 80 | 0.90 ± .04 | 0.74 ± .02 |
| TFEP | 2000 | 310 | 500 | 70 | 1.47 ± .05 | 1.25 ± .04 |
| IIR | 2030 | 330 | 385 | 70 | 1.82 ± .30 | 1.24 ± .17 |
| ACM | 1875 | 340 | 610 | 70 | 3.05 ± .19 | 1.83 ± .12 |
| CR | 2220 | 160 | 1320 | 80 | 2.04 ± .20 | 1.41 ± .09 |
| CSM | 2600 | 320 | 890 | 70 | 1.42 ± .08 | 1.22 ± .06 |

[1]Determined according to ASTM D 1415.

3. Fluorination Procedures

The general procedure for the direct fluorination of articles by the methods of this invention has been discussed above. Particular fluorination parameters (i.e. fluorine and nitrogen flow rates, duration of reaction, etc.) that were used to create the specific test articles used to illustrate this invention are listed in Table 3.

All reactions were performed at room temperature in a brass reactor vessel with an internal volume of 0.75 liters. Those skilled in the art will recognize that the parameters presented in Table 3 may be adjusted through routine experimentation to allow the use of alternative reactor designs and capacities. Additionally, these parameters may be routinely adjusted to accommodate the fluorination of suitable alternative elastomer formulations. Typical batch sizes for the preparation of test articles ranged from 1-20 pieces and weighted between 1-80 grams in total.

Table 3 lists only the fluorination conditions; in all cases, the reactor vessel was purged with nitrogen before and after the fluorination process as indicated in Table 1.

TABLE 3

Fluorination Parameters Used to Generate Fluorinated Elastomeric Articles

| ELASTOMER | FLUORINE FLOW RATE (SCCM) | NITROGEN FLOW RATE (SCCM) | TIME (MINS) |
|---|---|---|---|
| EP | 25 | 35 | 60 |
| NBR | 25 | 35 | 90 |
| NBR-IL | 25 | 35 | 90 |
| XNBR | 25 | 35 | 90 |
| HSNBR | 25 | 35 | 90 |
| FKM-1 | 30 | 25 | 240 |
| FKM-2 | 30 | 25 | 240 |
| TFEP | 30 | 25 | 120 |
| IIR | 25 | 35 | 90 |
| ACM | 25 | 35 | 60 |
| CR | 25 | 35 | 60 |
| CSM | 25 | 35 | 60 |

4. Experimental Results

A. Coefficients of Friction

Static and dynamic coefficients of friction for all test articles were determined according to ASTM D 1894. The results of these tests are presented in Table 4.

TABLE 4

Static and Dynamic Friction Coefficients of Fluorinated Elastomers

| ELASTOMER | STATIC FRICTION COEFFICIENT | DYNAMIC FRICTION COEFFICIENT |
|---|---|---|
| EP | 0.22 ± .02 | 0.18 ± .02 |
| NBR | 0.16 ± .02 | 0.13 ± .01 |
| NBR-IL | 0.29 ± .01 | 0.23 ± .01 |
| XNBR | 0.23 ± .04 | 0.20 ± .01 |
| HSNBR | 0.18 ± .01 | 0.14 ± .01 |
| FKM-1 | 0.84 ± .04 | 0.68 ± .04 |
| FKM-2 | 0.41 ± .04 | 0.27 ± .03 |
| TFEP | 0.15 ± .02 | 0.12 ± .01 |
| IIR | 0.37 ± .03 | 0.30 ± .03 |
| ACM | 0.39 ± .05 | 0.31 ± .03 |
| CR | 0.40 ± .04 | 0.33 ± .04 |
| CSM | 0.35 ± .03 | 0.27 ± .02 |

Static and dynamic friction coefficients for the starting materials are presented in Table 2. In all Examples, the fluorinated elastomers exhibited drastically reduced friction coefficients compared to their non-fluorinated counterparts.

With the exception of the FKM systems, articles exposed to fluorine typically exhibited static and dynamic friction coefficients that were between 10 to 25% of the values for the non-fluorinated counterpart. That FKM systems did not exhibit such a dramatic friction reduction may be explained, at least in part, by the fact that these systems were compounded from partially fluorinated base polymers and therefore contained fewer "replaceable" hydrogen atoms in the polymer backbone.

The fluorinated "NBR-IL" system exhibited an approximately 3 fold decrease in friction coefficients compared to the parent compound. This indicates that the method of this invention is capable of generating a superior reduction in friction than may be obtained by use of internal lubricants.

B. Taber Abrasion

Taber Abrasion data was determined according to ASTM D 3389 using the modification developed by Akron Rubber Development Laboratory, Inc., and discussed above. Test results are presented in Table 5.

TABLE 5

Taber Abrasion Data for Fluorinated and Non-fluorinated Elastomers[1]

| ELASTOMER | CYCLES TO WEAR-THROUGH[2] | | WEAR FACTOR[3] |
|---|---|---|---|
| | FLUORINATED | NON-FLUORINATED | |
| EP | 700 | 300 | 0.43 |
| NBR | 200 | 150 | 0.75 |
| NBR-IL | 225 | 175 | 0.78 |
| XNBR | 250 | 125 | 0.50 |
| HSNBR | 600 | 300 | 0.50 |
| FKM-1 | 500 | 300 | 0.60 |
| FKM-2 | 600 | 400 | 0.67 |
| TFEP | 185 | 90 | 0.49 |
| IIR | 100 | 70 | 0.70 |
| ACM | 125 | 40 | 0.32 |
| CR | 240 | 150 | 0.62 |
| CSM | 40 | 30 | 0.75 |

[1]H-18 wheels at 1 kg. loading
[2]Mean of 3 separate runs taken.
[3]Wear factor is defined as:

$$\text{Wear Factor} = \frac{\text{cycles to wear-through for non-fluorinated elastomers}}{\text{cycles to wear-through for fluorinated elastomers}}$$

In all cases, the fluorinated article had superior Taber Abrasion characteristics.

C. Tensile Testing

All tensile testing was performed according to ASTM D412.

Test results are presented in Table 6.

TABLE 6

Tensile Properties of Fluorinated Elastomers

| ELASTOMER | TENSILE STRENGTH (PSI) | ELONGATION (%) | 100% MODULUS (PSI) | HARDNESS[1] (SHORE A) |
|---|---|---|---|---|
| EP | 1760 | 165 | 910 | 80 |
| NBR | 2100 | 350 | 550 | 70 |
| NBR-IL | 1410 | 135 | 980 | 76 |
| XNBR | 2500 | 190 | 1050 | 80 |
| HSNBR | 2820 | 400 | 300 | 65 |
| FKM-1 | 2100 | 150 | 1375 | 75 |
| FKM-2 | 2700 | 240 | 1020 | 80 |
| TFEP | 1700 | 250 | 500 | 70 |
| IIR | 2060 | 330 | 400 | 70 |
| ACM | 1875 | 330 | 630 | 70 |
| CR | 2020 | 150 | 1320 | 80 |
| CSM | 2550 | 290 | 900 | 70 |

[1]Determined according to ASTM D 1415.

Tensile strength of the fluorinated elastomers were generally found to be within ±10% of the values for the corresponding nonfluorinated elastomer (see Table 2 for original physical properties of starting materials). Elongation values for the fluorinated elastomers were typically 3–5% lower than the corresponding values for the parent systems. 100% Modulus values remained fairly constant for all systems before and after exposure to fluorine.

Stress/strain curves were plotted for all systems before and after exposure to fluorine. In all elastomers studied, no significant differences were found between the stress/strain behavior of fluorinated and non-fluorinated systems. This indicates that, essentially, the mechanical behavior of a fluorinated elastomer prepared by the methods of this invention will be the same as that of the non-fluorinated precursor.

The stress/strain plots of two elastomers (NBR and FKM-2) before and after exposure to fluorine are presented in FIGS. 1 through 4, respectively.

D) Infrared Analysis

Infrared analysis of all elastomers before and after exposure to fluorine was made with a Nicolet Model 5PC FTIR Spectrometer, using the ATR technique (see "Analytical Techniques" Section).

The infrared spectra of all elastomers after exposure to fluorine by the methods of this invention were characterized by a broad, relatively intense absorption centered around 1,100 wavenumbers. This absorption frequency is characteristic of the carbon-fluorine bond; its presence indicates the fluorination of the base polymer in each elastomer. With the exception of this absorption, most IR spectra of fluorinated elastomers were relatively featureless.

The appearance of an absorption frequency at 1,100 wavenumbers occured with the concomitant loss of a strong absorption frequency at around 3,000 wavenumbers, observed in the IR spectra of all elastomers studied, prior to fluorine exposure. It is well documented that carbon-hydrogen bonds absorb IR radiation at around 3,000 wavenumbers. Consequently, this indicates that exposure of hydrocarbon-based elastomers to fluorine results in the replacement of hydrogen atoms on the polymer backbone by fluorine atoms.

Figure 5:
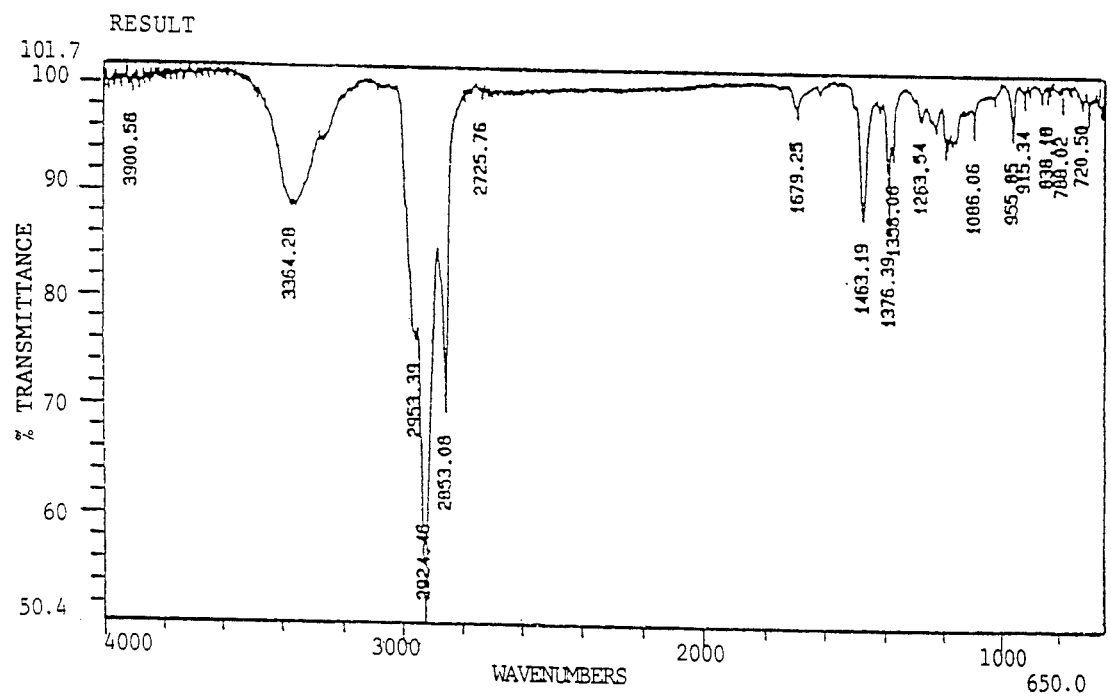
Figure 6:
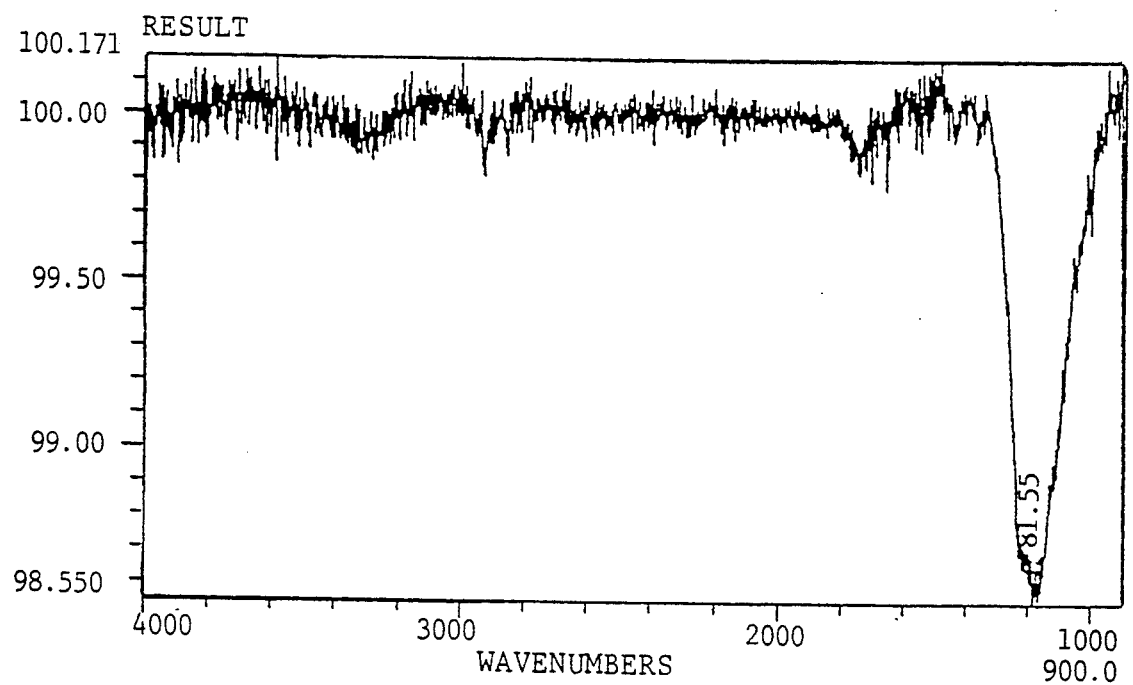

The FTIR spectra of the "EP" elastomer before and after exposure to fluorine are presented in FIG. 5 and FIG. 6, respectively.

E) Miscellaneous Wear Testing

This invention is further illustrated by the following examples:

EXAMPLE 1

To a brass reactor vessel, internal volume 0.75 liters, was charged anhydrous sodium fluoride powder (30.0 g) and a teflon-coated magnetic stir bar (2" length). Three elastomeric radial lip seals (total weight 22.955 g, approximate O.D. 1.5", Part No. CR9843), containing an acrylonitrile-butadiene base polymer were charged into the reactor vessel. These seals were stirred in the sodium fluoride at 30 rpm. After sealing the vessel and purging for 30 minutes with UPC grade nitrogen at 150 scc/min., the fluorine flow was set at 25 scc/min. and the nitrogen flow set at 35 scc/min. These flowrates were maintained for 90 minutes at room temperature, after which time the fluorine flow was stopped. The reactor was then repurged with UPC nitrogen for 30 minutes at 150 scc/min. The fluorinated seals were removed from the reactor and washed with warm water. After drying at 75° C. for ten minutes, the seals weighed 23.023 grams.

Figure 7:
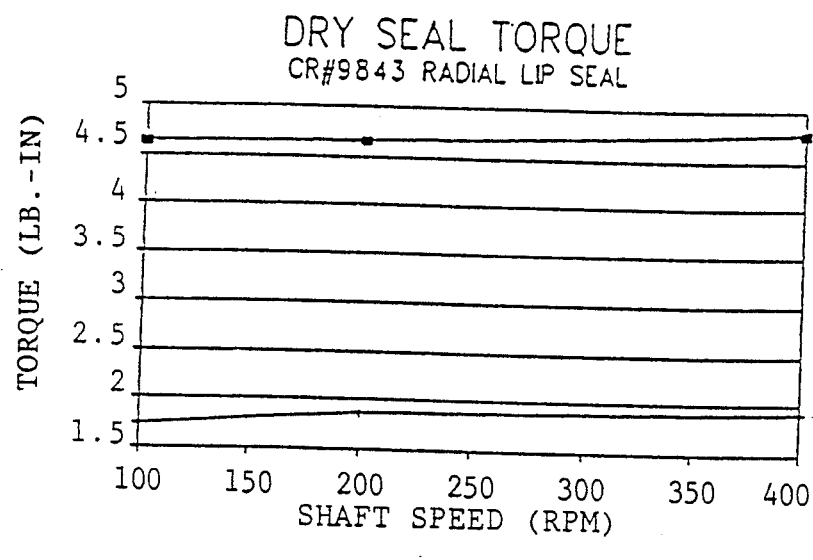

A seal torque test, which measures the inherent torque of the seal as it operates against a metal rod, was performed for both fluorinated and non-fluorinated lip seals. The results of these tests, presented in FIG. 7, indicated significant reduction in torque for the fluorinated seal over the standard seal. This torque reduction is directly attributable to the reduction in static and dynamic friction coefficients in the fluorinated seal.

EXAMPLE 2

To a brass reactor vessel, internal volume 0.75 liters, was charged anhydrous sodium fluoride (25.0 g) and a teflon-coated magnetic stir bar (2" length). Twenty (20) 2-214 sized O-rings, fabricated from "EP" elastomer (total weight 21.152 g), were charged into the reactor vessel. The O-rings were stirred in sodium fluoride at about 30 rpm. After sealing and purging the reactor vessel as before, the fluorine flow was set at 25 scc/min. and the nitrogen flow was set at 35 scc/min. These flowrates were maintained for 60 minutes at room temperature, after which time the fluorine flow was stopped. The reactor was then purged with nitrogen as before. The seals were removed and washed with warm water. After drying for ten minutes at 75° C., the seals weighed 21.207 grams.

Fluorinated and non-fluorinated "EP" 2-214 O-rings were life-cycled in Skydrol 500B-4 hydraulic fluid at 225° C. as required by National Aerospace Specification (NAS) 1613. This specification requires that O-rings be mounted in a gland and subjected to a 4" axial stroke from a chrome-plated rod at a rate of 30 cycles/min. with a pressure fluctuation of 0–3,000 psi/stroke. The primary purpose of this experiment was to determine if the demonstrated friction reduction in the fluorinated "EP" O-rings equates to an increase in wear life in the life cycle test.

The number of cycles each seal completed before failure was as follows:

| Standard "EP" Elastomer | Fluorinated "EP" Elastomer |
| --- | --- |
| 137,600 cycles | 181,600 cycles |

As demonstrated by the test data, the method of the present invention resulted in extended wear life in these systems.

EXAMPLE 3

To the same reactor vessel discussed above was added sodium fluoride (15.0 g) and a teflon-coated magnetic stir bar. Fifty (50) 2-013 sized O-rings of an acrylonitrile-butadiene formulation (total weight 5.910 g) were charged into the reactor. After thoroughly purging the vessel as before, fluorine and nitrogen flowrates were set at 25 and 35 scc/min., respectively. After maintaining these conditions for 90 minutes, the fluorine flow was stopped and the reactor vessel purged. After washing and drying, the O-rings weighed 5.939 grams.

The static and dynamic friction coefficients of the seal material were determined before and after exposure to fluorine according to ASTM D 1894. The results are as follows:

|  | Static Friction Coefficient | Dynamic Friction Coefficient |
| --- | --- | --- |
| Before fluorination | 1.22 ± .06 | 1.11 ± .06 |
| After fluorination | 0.13 ± .01 | 0.10 ± .01 |

EXAMPLE 4

The reactor vessel was charged with sodium fluoride (20.0 g) and 225 pieces of an elastomeric U-Cup, Part No. P02007 (total weight 8.51 g), formulated from an acrylonitrile-butadiene base polymer. The articles were fluorinated in an identical manner to that described in Example 3. After preparing the parts in the usual manner, they weighed 8.76 grams.

The static and dynamic friction coefficients of the seal material were determined before and after exposure to fluorine. The results were as follows:

|  | Static Friction Coefficient | Dynamic Friction Coefficient |
| --- | --- | --- |
| Before fluorination | 1.55 ± .10 | 1.16 ± .05 |
| After fluorination | 0.19 ± .01 | 0.17 ± .01 |

EXAMPLE 3

The reactor vessel was charged with sodium fluoride powder (100 g), a teflon-coated stir bar and eight pieces of an elastomeric U-cup (total weight 97.269 g) formulated from a vinylidene fluoride-hexafluoropropylene copolymer. After thoroughly purging the reactor vessel as before, fluorine and nitrogen flowrates were set at 30 and 25 scc/min, respectively. After maintaining these flowrates for 240 minutes, the fluorine flow was stopped and the reactor vessel purged with nitrogen. The fluorinated articles were removed from the reactor vessel, washed and then dried as before. The product weighed a total of 97.448 grams.

The static and dynamic friction coefficients of the seal material were determined as before.

|  | Static Friction Coefficient | Dynamic Friction Coefficient |
| --- | --- | --- |
| Before fluorination | 1.56 ± .15 | 1.31 ± .20 |
| After fluorination | 0.68 ± .04 | 0.50 ± .04 |

EXAMPLE 6

The reactor vessel was charged with sodium fluoride (15.0 g), a teflon-coated stir bar and 50 pieces of an elastomeric O-ring, size 2-013, to be used as a pneumatic spool seal. The O-rings were of an acrylonitrile-butadiene formulation and weighed 5.910 grams. After thoroughly purging the reactor as usual, fluorine and nitrogen flowrates were set at 25 and 35 scc/min., respectively. After maintaining these flowrates for 90 minutes, the fluorine flow was stopped and the reactor vessel purged with nitrogen. After washing and drying as usual, the product weighed 5.942 grams.

The performance of fluorinated and non-fluorinated spool seals were evaluated measuring the minimum shift pressure as the seal was cycle tested. These tests were performed in a pneumatic application, i.e. no fluid was present. The results are shown in Table 7.

TABLE 7

Minimum Shift Pressure of Fluorinated and Non-fluorinated Spool Seals

| No. of Cycles ($\times 10^6$) | Minimum Shift Pressure (psi) | | % Advantage of Fluorinated Elastomer |
|---|---|---|---|
| | Standard Elastomer | Fluorinated Elastomer | |
| 0 | 20.00 | 22.00 | −10.0 |
| 2 | 28.75 | 25.60 | +12.3 |
| 4 | 38.75 | 29.06 | +33.3 |
| 6 | 45.63 | 30.63 | +48.0 |
| 8 | 46.56 | 31.88 | +46.1 |
| 10 | 50.00 | 33.13 | +50.9 |
| 15 | 50.00 | 35.00 | +42.9 |
| 20 | 50.00 | 37.50 | +33.3 |

It can be seen that the fluorinated elastomer exhibited a significantly reduced running friction compared to the non-fluorinated elastomer.

While this invention has been described as having a preferred design, the present invention can be further modified within the spirit and scope of this disclosure. This application is therefore intended to cover any variations, uses, or adaptations of the invention using its general principles Further, this application is intended to cover such departures from the present disclosure as come within known or customary practice in the art to which this invention pertains and which fall within the limits of the appended claims.

What is claimed is:

1. A method of producing fluorinated elastomeric articles, consisting essentially of the following steps:
   providing an elastomeric article, said elastomeric article comprising an elastomeric polymer having a backbone chain having a plurality of hydrogen atoms attached thereto; and
   exposing said elastomeric article to gaseous fluorine under conditions sufficient to reduce the friction coefficient of said article without promoting degradation of the tensile properties of said article.

2. The method of claim 1, wherein said elastomeric article is exposed to gaseous fluorine in a reactor vessel in the presence of a hydrogen fluoride scavenger.

3. The method of claim 1, in which said reactor vessel is flushed with an inert gas prior to the step of exposing said elastomeric article to fluorine gas, and wherein said fluorine gas is exposed to said elastomeric article as a gaseous mixture of fluorine and said inert gas.

4. The method of claim 3, wherein the concentration of fluorine in the gaseous mixture is between about 2% and about 95%.

5. The method of claim 3, wherein the concentration of fluorine in the gaseous mixture is between about 5% and about 75%.

6. The method of claim 3, wherein the concentration of fluorine gas in said gaseous mixture is at least 0.5%.

7. The method of claim 1, in which said backbone chain is substantially comprised of carbon atoms having a high proportion of hydrogen atoms attached thereto by replaceable aliphatic carbon-hydrogen bonds, wherein a sufficient number of said hydrogen atoms of said backbone chain are replaced by fluorine atoms when said article is exposed to gaseous fluorine so that a fluorinated material is generated on the external portion of said article and extends inward into the matrix of said elastomer.

8. A method for producing a fluorinated elastomeric article having a reduced coefficient of friction, comprising the steps of:
   placing a thermoset elastomeric article and a hydrogen fluoride scavenger in a closed reactor vessel, said thermoset elastomeric article comprising an elastomeric base polymer having a backbone chain, said backbone chain including sufficient carbon atoms having replaceable aliphatic carbon-hydrogen bonds so that a fluorinated matrix of said fluorinated elastomeric article reduces said coefficient of friction;
   establishing a flow of an inert gas into the reactor vessel to provide an inert gas atmosphere and purge said vessel of oxygen and moisture; and
   fluorinating said elastomeric article by introducing a flow of fluorine gas into said reactor vessel so that said article is exposed to a gaseous mixture of fluorine gas and said inert gas, the proportion of fluorine gas in said mixture being sufficient to reduce said coefficient of friction of the article, said article being exposed to said fluorine gas under conditions such that degradation of the tensile properties of the article is minimized.

9. The method of claim 8, wherein said elastomeric base polymer is blended with at least one of fillers, plasticizers and curing additives.

10. The method of claim 9, in which said fillers comprise at least one of carbon black, graphites, powders, silicone, calcium carbonate, glass powder, talcs and clays, wherein said fillers and said base polymer comprise about 75–90% of said elastomeric article.

11. The method of claim 8, wherein said elastomeric polymer comprises at least one member selected from the group consisting of polybutadienes, isobutylene-isoprene elastomers, chlorinated polyethylenes, chlorosulfonated polyethylenes, polyepichlorohydrins, ethylene/acrylic elastomers, ethylene-propylene copolymers, ethylene-propylene-diene terpolymers, tetrafluoroethylene-propylene copolymers, vinylidene fluoride-hexafluoropropylene copolymers, butadiene-acrylonitrile copolymers, polychloroprenes, styrene-butadiene copolymers, polyisoprenes, carboxy-modified butadiene-acrylonitrile elastomers and acrylonitrile-ethylene-butadiene terpolymers.

12. The method of claim 8, wherein said hydrogen fluoride scavenger comprises sodium fluoride or potassium fluoride.

13. The method of claim 8, in which hydrogen fluoride is released by the reaction between said fluoride and said elastomer, and wherein said hydrogen fluoride scavenger is present in an amount sufficient to react with substantially all of said hydrogen fluoride formed by the reaction between said fluoride and said elastomer.

14. The method of claim 8, wherein the concentration of fluorine in said gaseous mixture is between about 5% and about 75%.

15. A method for producing a fluorinated elastomeric article having a reduced coefficient of friction and increased wear life, comprising the steps of:
   providing an elastomeric article molded from a thermoset elastomeric polymer, said polymer having a backbone chain essentially composed of carbon atoms to which are attached a high proportion of replaceable hydrogen atoms; and modifying the structure of said elastomeric article by fluorinating said article under conditions sufficient to generate a fluorinated material on the external surface of said elastomeric article and extending inwardly into the matrix of said polymer to a depth sufficient to reduce said coefficient of friction, said fluorination conditions being sufficient to substantially maintain the tensile properties of said modified article 16. The method of claim 15, wherein said polymer is fluorinated in the presence of a hydrogen fluoride scavenger.

17. A method of enhancing the properties of articles molded from thermoset elastomers, said method consisting essentially of the following steps:
  placing a hydrogen fluoride scavenger in a fluoride reactor vessel;
  placing a plurality of said articles into said reactor vessel, each of said articles comprising at least one elastomeric polymer having a generally hydrocarbon backbone chain;
  establishing an inert atmosphere in said reactor vessel by flushing said vessel with a flow of inert gas; and
  introducing a flow of fluorine gas into said reactor vessel under conditions to fluorinate said articles, said fluorination being limited generally to the external surface of said articles and extending inwardly into the polymer matrix to a depth sufficient to reduce the coefficient of friction and increase the wear life of said articles, said fluorination conditions being sufficient to substantially maintain the tensile properties of said article and inhibit the scission of said backbone chain.

18. An elastomeric article having an improved wear life and a reduced coefficient of friction prepared by the process consisting essentially of the following steps:
  providing an elastomeric article, said elastomeric article comprising an elastomeric polymer having a backbone chain, said backbone chain being substantially comprised of carbon atoms having a high proportion of hydrogen atoms attached thereto by replaceable aliphatic carbon-hydrogen bonds; and
  exposing said elastomeric article to gaseous fluorine under conditions sufficient to reduce the friction coefficient of said article without promoting degradation of the tensile properties of said article.

19. The article of claim 18, wherein a sufficient number of said hydrogen atoms of said backbone chain are replaced by fluorine atoms when said article is exposed to said gaseous fluorine so that a fluorinated material is generated on the external portion of said article and extends inward into the matrix of said article.

20. The article of claim 18, wherein said elastomeric article is exposed to gaseous fluorine in a reactor vessel in the presence of a hydrogen fluoride scavenger.

21. The article of claim 20, in which said reactor vessel is flushed with an inert gas prior to the step of exposing said elastomeric article to fluorine gas, and wherein said fluorine gas is exposed to said elastomeric article as a gaseous mixture of fluorine and said inert gas.

22. The article of claim 21, wherein the concentration of fluorine in the gaseous mixture is between about 2% and about 95%.

23. A fluorinated elastomeric article having a reduced coefficient of friction and an increased wear life, prepared by the process comprising the steps of:
  providing an elastomeric article molded from an elastomeric polymer, said elastomeric polymer having a backbone chain essentially composed of carbon atoms to which are attached a high proportion of hydrogen atoms; and
  modifying the structure of said elastomeric article by fluorinating said article under conditions sufficient to generate a fluorinated material on the external surface of said elastomeric article and extending inwardly into the matrix of said polymer to a depth sufficient to reduce said coefficient of friction, said fluorination conditions being sufficient to substantially maintain the tensile properties of said article.

* * * * *